United States Patent
Sun et al.

(10) Patent No.: US 6,630,245 B2
(45) Date of Patent: Oct. 7, 2003

(54) ARTICLES AND FILM OF POLY-α-OLEFIN HAVING REDUCED COEFFICIENT OF FRICTION

(75) Inventors: Likuo Sun, Houston, TX (US); Edwar Shoukri Shamshoum, Gibsonia, PA (US); William R. Wheat, Waterloo (BE); Paul Buras, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/511,578

(22) Filed: Feb. 23, 2000

(65) Prior Publication Data

US 2003/0134965 A1 Jul. 17, 2003

(51) Int. Cl.$^7$ ............................................... B32B 27/08
(52) U.S. Cl. ......................... 428/516; 524/232; 524/528
(58) Field of Search ................................. 524/528, 232; 428/215, 336, 349, 355 R, 355 AC, 461, 516

(56) References Cited

U.S. PATENT DOCUMENTS

| | | | |
|---|---|---|---|
| 4,500,681 A | 2/1985 | Shulman | |
| 4,857,409 A | 8/1989 | Hazelton et al. | |
| 5,891,940 A | * 4/1999 | Chen et al. | 524/229 |
| 5,981,047 A | 11/1999 | Wilkie | 428/215 |

FOREIGN PATENT DOCUMENTS

| WO | 0077115 | 12/2000 |
|---|---|---|

* cited by examiner

*Primary Examiner*—Peter D. Mulcahy
(74) *Attorney, Agent, or Firm*—Bradley A. Misley

(57) ABSTRACT

Provided is polyolefin-based compound, resin, mixture, or combinations thereof, providing products having reduced coefficient of friction, comprising:

A) polyolefin other than syndiotactic poly-α-olefin;

B) about 0.1% to about 70% syndiotactic poly-α-olefin; and

C) about 0.01% to about 5% of: slip agent, anti-block agent, or combinations thereof; as well as process for producing the same.

18 Claims, 2 Drawing Sheets

ARTICLES AND FILM OF POLY-α-OLEFIN HAVING REDUCED COEFFICIENT OF FRICTION

FIELD OF THE INVENTION

This invention relates to the use of blends of syndiotactic and isotactic poly-α-olefin to achieve an overall reduction of the coefficient of friction of films made from such blends. This may also be viewed as a reduction of characteristics or enhancement of "slip" characteristics of the films without inclusion of excessive additives, other than poly-α-olefins, into the polymer, its films, or other articles of the polymer.

BACKGROUND OF THE INVENTION

It is known that films of polyolefins may have tendencies toward sticking to themselves or displaying coefficients of friction which are higher than desirable. With these tendencies to stick to itself or have low coefficient of friction, such films may become difficult to use and handle. Slip agents are available in the marketplace, these include fatty amides such as erucamide, fluoropolymers including Viton®, and various other agents, including some anti-block agents which may assist in enhancing the apparent slip or coefficient of friction of films or articles.

While these additives are beneficial in reducing the coefficient of friction for polymer films, compounders will prefer not to add too much of them to the polymer or during film production in light of costs and since film characteristics may be adversely affected. Also, inclusion of large amounts of such additives may yield films having other detrimental characteristics such as transfer of additive smells or tastes into goods enclosed within the film products, particularly foods or medicines.

We have found that these additives may be kept at reasonable levels while providing films with good coefficients of friction by blending polymers of differing stereoregular configurations. From this, what appears to be a synergistic effect between the slip additive and the syndiotactic polyolefin provides advantage.

Others have found benefit in blending polymers to enhance different characteristics. U.S. Pat. No. 4,857,409 issued Aug. 15, 1989 to Hazelton and Shulman, describes a composite film composition comprising a rubber core layer wherein said layer is comprised of about 50 to 85 weight percent rubber and 15 to 40 weight, percent of a polyolefin and a minimum of one polyolefin resin skin layer coextruded onto said core layer. The rubber component of the core layer is selected from a group of specific possibilities.

U.S. Pat. No. 4,500,681 issued Feb. 19, 1985 to Shulman describes a composition of matter comprised of a thermoplastic elastomeric blend of a polyolefin component, an isobutylene-backbone elastomer component, and a copolymer component of ethylene and an unsaturated ester of a lower carboxylic acid. The polyolefin component comprises from about 20 to about 65 weight percent of the composition and is selected from isotactic polypropylene or polypropylene reactor copolymer containing about 1 to 20 weight percent of an alpha-olefin comonomer or mixtures thereof. The isobutylene-backbone elastomer component comprises from about 20 to 60 weight percent of the compound and the copolymer component comprises about 7 to about 40 weight percent of the composition.

These blended polymer resins do not provide the tough film with reduced coefficient of friction as is addressed by our invention.

SUMMARY OF THE INVENTION

Our invention provides, at least, polymer blends which yield films having reduced coefficient of friction over similar films which contain higher loadings of slip agents or similar loadings with no syndiotactic poly-α-olefin additive. Also provided are films of reduced coefficients of friction and methods for producing such blends and such films.

DETAILED DESCRIPTION

Figure 1:
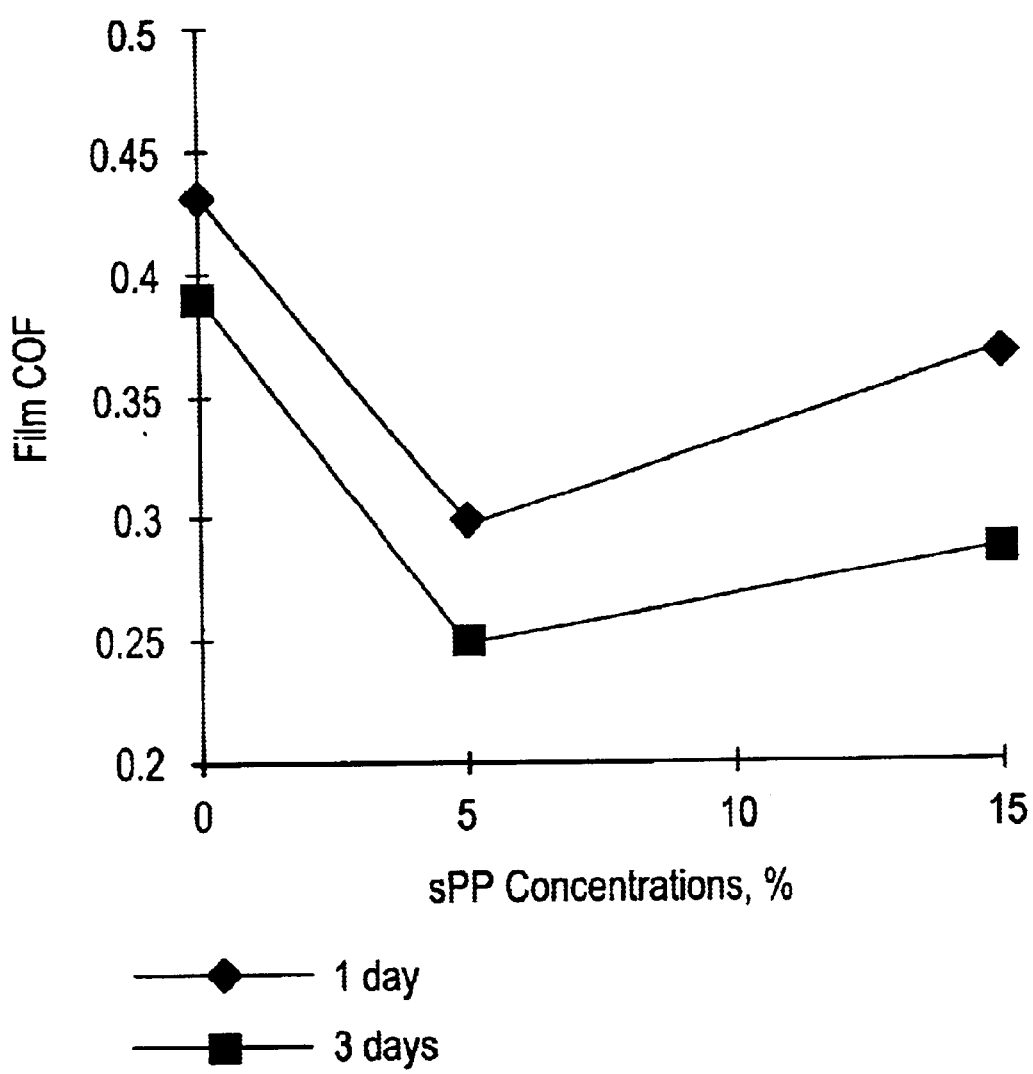
FIG. 1 displays one and three day plots of coefficient of friction for film against sPP concentration (in iPP) for resins compounded with 0.15% of a common slip agent which were used to produce the films.

This invention provides embodiments of our invention relating to films of polypropylene having reduced coefficient of friction.

One embodiment of our invention provides polyolefin-based compound, resin, mixture, or combinations thereof, providing products having reduced coefficient of friction, comprising:

A) polyolefin other than syndiotactic poly-α-olefin;

B) about 0.1% to about 70% syndiotactic poly-α-olefin; and

C) about 0.01% to about 5% of: slip agent, anti-block agent, or combinations thereof.

Another embodiment provides film comprising polyolefin-based compound, resin, mixture, or combinations thereof which during or after compounding, forming, or combinations thereof, comprises:

A) polyolefin other than syndiotactic poly-α-olefin;

B) about 0.1% to about 70% syndiotactic poly-α-olefin; and

C) about 0.01% to about 5% of: slip agent, anti-block agent, or combinations thereof.

A further embodiment provides film comprising polyolefin, with the. exception of poly-4-methylpentene, having coefficient of friction less than about 0.50 as measured at 23° C. one day after film formation. The coefficient of friction given is the ratio of frictional force to the force acting perpendicular to two surfaces which are in contact with each other.

A particularly useful embodiment provides polypropylene film having coefficient of friction as measured at 23° C. one day after film formation less than about 0.50, such film comprising:

A) about 0.1% to about 70% syndiotactic poly-α-olefin; and

B) about 0.01% to about 5% of: slip agent, anti-block agent, or combinations thereof.

Another embodiment provides process of producing poly-α-olefin film having reduced coefficient of friction comprising the steps of:

A) Blending, compounding, mixing or combinations thereof, the desired poly-α-olefin with:

i) between about 0.1% to about 70% syndiotactic poly-α-olefin; and ii) about 0.01% to about 5% of: slip agent, anti-block agent, or combinations thereof; and B) Forming film of resulting resin.

In each of these embodiments, progressively preferred upper range levels of the syndiotactic component will be about 50% and about 30%. Progressively preferred lower range levels will be about 1% and about 5%. Progressively preferred upper ranges for the slip agent will be about 1% and about 0.2%. The preferred lower range will be about 0.05%.

In an effort to illuminate our invention, examples are provided here. While these examples exemplify our invention, they do not fully define the scope and breadth of the invention. Those skilled in the art of polyolefins will, upon review of these examples, recognize other unstated embodiments of our invention. We consider these apparent manifestations to be within the scope of our claimed invention.

EXAMPLES

Example 1

A random copolymer of ethylene and propylene, MTC EFL-560 available from Mitsui-Toatsu, having about 3% ethylene and being available from Mitsui Toatsu, was tested by forming into 0.03 mm films cast by extrusion. The coefficient of friction (COF) of these films was tested, according to ASTM-D-1894, at 23° C. after three days, 35° C. after one day, and 35° C. after three days. This same random copolymer (RCP) was then blended and compounded with 10%, 20%, and 30% syndiotactic polypropylene, EOD 93-06 available from Fina Oil & Chemical Company, Deer Park, Tex., USA. The resulting compounded resins were then extruded into similar 0.03 mm cast films. The COF of each resulting film was then measured at like intervals of time at like temperatures. All samples had like additive packages. The RCP (EFL-560) was compounded (based upon resin weight) with about 300 ppm IrgafosP-EPQFF, 800 ppm Irganox 168, 800 ppm Irganox 1010 (all available from Ciba-Geigy), 300 ppm Hydrotalcite (available from Mitsui Petrochemical), 600 ppm Neutron-S, and 2,000 ppm. Syloid 66 (available from W. R. Grace Chemical Company). The syndiotactic polypropylene was compounded with 300 ppm IrgafosP-EPQFF, 800 ppm Irganox 168, 1,000 ppm Irganox 1010 (all available from Ciba-Geigy), 200 ppm talc (available from Nicron, USA), 1,000 ppm Neutron-S, and 1,500 ppm Syloid 66 (available from W.R. Grace Chemical Company). The results of the COF measurements for the films of the RCP and its blends are presented in Table 1 below.

TABLE 1

| Sample | Random Copolymer | 90% RCP 10% sPP | 80% RCP 20% sPP | 70% RCP 30% sPP |
|---|---|---|---|---|
| Pellet MFR, g/10 min | 7.1 | 7.1 | 7.7 | 7.7 |
| COF @ 23° C., 3 days | 0.34 | 0.09 | 0.09 | 0.07 |
| COF @ 35° C., 1 day | 0.38 | 0.11 | 0.09 | 0.09 |
| COF @ 35° C., 3 days | 0.32 | 0.11 | 0.09 | 0.07 |

Example 2

Figure 2:
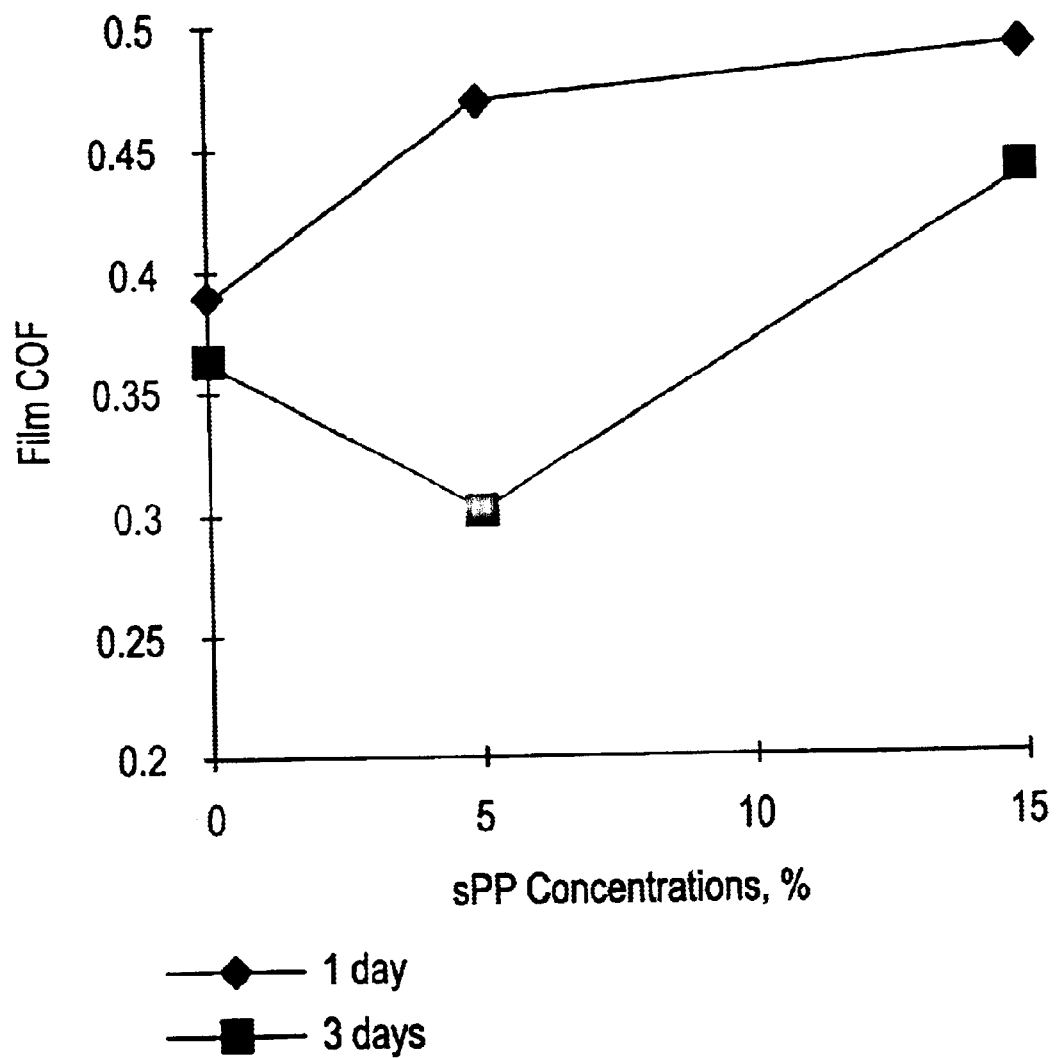
FIG. 2 displays one and three day plots of coefficient of friction for film against sPP concentration (in iPP) for resins compounded with 0.05% of a common slip agent which were used to produce the films.

A commercially available isotactic polypropylene (iPP), Fina 3500u/70366 available from Fina Oil & Chemical Company in Deer Park, Tex., was used neat and in blends with Fina's EOD95-05/29066, a commercially available syndiotactic polypropylene (sPP) to create a series of materials for testing in which Ethanox 330, available from Ethyl Corporation and Irganox 168, available from Ciba-Geigy were added, as anti-oxidant stabilizers, in amounts of 0.1% and 0.05% respectively while erucamide, a fatty amide slip agent, was varied among 0%, 0.05%, and 0.15%. Using an Egan cast film line, films of each polymer or polymer blend were extruded, at film thickness of 0.08 mm (0.003 in) at 254° C. melt temperature and 15.5° C. chill roll temperature, and tested for COF upon extrusion, at one day, and at 3 days post extrusion. The polymer compositions are delineated in Table 2 below. The COF results of this series of experiments are presented in Table 3. FIGS. 1 and 2 graphically present results of this experiment for slip agent levels of 0.15% and 0.05%, respectively.

TABLE 2

| Sample # | 1 | 2 | 3 | 4 | 5 | 6 | 7 | 8 |
|---|---|---|---|---|---|---|---|---|
| 3500 u/70366 fluff, % | 100 | 85 | 100 | 100 | 85 | 85 | 95 | 95 |
| EOD95-05/29066, sPP, fluff, % | — | 15 | — | — | 15 | 15 | 5 | 5 |
| Ethanox 330, % | 0.1 | 0.1 | 0.1 | 0.1 | 0.1 | 0.1 | 0.1 | 0.1 |
| Irganox 168, % | 0.05 | 0.05 | 0.05 | 0.05 | 0.05 | 0.05 | 0.05 | 0.05 |
| Erucamide, % | — | — | 0.15 | 0.05 | 0.15 | 0.05 | 0.15 | 0.05 |

TABLE 3

| Sample # | 1 | 2 | 3 | 4 | 5 | 6 | 7 | 8 |
|---|---|---|---|---|---|---|---|---|
| iPP/ | 100 | 85 | 100 | 100 | 85 | 85 | 95 | 95 |
| sPP | -0- | 15 | -0- | -0- | 15 | 15 | 5 | 5 |
| COF at 23° C., at 0 hours | 0.53 ± 0.11 | 0.69 ± 0.02 | 0.53 ± 0.05 | 0.58 ± 0.11 | 0.62 ± 0.02 | 0.70 ± 0.03 | 0.52 ± 0.08 | 0.64 ± 0.07 |
| COF at 23° C., at 1 day | 0.54 ± 0.07 | 0.57 ± 0.03 | 0.43 ± 0.04 | 0.39 ± 0.04 | 0.37 ± 0.01 | 0.49 ± 0.01 | 0.30 ± 0.03 | 0.47 ± 0.03 |
| COF at 23° C., at 3 days | 0.48 ± 0.03 | 0.46 ± 0.05 | 0.39 ± 0.01 | 0.36 ± 0.04 | 0.29 ± 0.01 | 0.44 ± 0.04 | 0.25 ± 0.03 | 0.30 ± 0.04 |

Review of the information presented in Table 1 demonstrates that inclusion of sPP with the polyolefin in of that series of experiments clearly lowers the coefficient of friction over the unmodified commercially available random copolymer. It is clear that inclusion of about 10% of the sPP notably lowers the film COF. Use of about 20% sPP appears to have further effect. The effect remains notable with inclusion of 30% sPP.

Review of Tables 1 and 2 demonstrate some important aspects of our invention. Viewing the results of COF measurements of the films produced in experiments #1 and #2 of Tables 2 and 3, it is indefinite as to whether notable reduction of COF occurs with the simple inclusion of sPP with the base polymer.

Comparison of experiments #3 and 4, with each other and with #1 and 2, clearly demonstrates that inclusion of the slip agent has a clear effect in lowering the COF of films produced. Viewing the average COF measurements and their ranges of measurement, between the two samples without sPP and with 0.15 and 0.05% slip agent, respectively, leaves an unclear determination as to whether increased amounts of slip agent has notable further effect.

Comparison of experiments #5, 6, 7, and 8 provide a dramatic demonstration that the combination of addition of slip agent and sPP with the base polymer provides remarkable reduction of COF in films produced from these polyolefin blends. It is clear that the effect arises within a wide range of concentrations of slip agent and within a wide range of concentrations of sPP. It is apparent that both additives must be present and that one or the other will not produce the magnitude of the effect which the combination produces.

As mentioned earlier, these examples are intended to provide clarification and direction in describing our invention; they are not intended to be exhaustive. Upon viewing these examples in combination with our complete description, other embodiments, which are within the scope of our claimed invention, will be clear to those skilled in the art. To further clarify the full extent of our invention, the following claims are provided.

We claim:

1. Polypropylene compound, resin, mixture, or combinations thereof, providing products having reduced coefficient of friction, comprising:
   A) at least 80% isotactic polypropylene;
   B) about 0.1% to about 20% syndiotactic polypropylene; and
   C) about 0.01% to about 1.5% of a slip agent comprising a fatty amide;
      wherein the polypropylene compound has a coefficient of friction that is less than a polypropylene compound without syndiotactic polypropylene that is otherwise identical.

2. Film layer comprising polypropylene compound, resin, mixture, or combinations thereof which during or after compounding, forming, or combinations thereof, comprises:
   A) at least 80% isotactic polypropylene;
   B) about 0.1% to about 20% syndiotactic polypropylene; and
   C) about 0.01% to about 1.5% of a slip agent comprising a fatty amide;
      wherein the film layer has a coefficient of friction that is less than a film layer comprising a polypropylene compound without syndiotactic polypropylene that is otherwise identical.

3. Film layer of claim 2 wherein the fatty amide is erucamide, the film having coefficient of friction less than about 0.50 as measured at 23° C. one day after film formation.

4. Isotactic polypropylene film layer having coefficient of friction as measured at 23° C. one day after film formation less than about 0.50, such film comprising:
   A) about 0.1% to about 20% syndiotactic polypropylene;
   B) about 0.01% to about 1.5% of a slip agent comprising a fatty amide;
      wherein the film layer has a coefficient of friction that is less than a film layer comprising a polypropylene compound without syndiotactic polypropylene that is otherwise identical.

5. Material of claim 1 wherein the fatty amide is erucamide present in an amount between about 0.05% and about 1%.

6. Material of claim 5 wherein syndiotactic polypropylene is present in an amount in the range of between about 5% and 20% and the slip agent is present in an amount between about 0.05% and about 0.2%.

7. Film of claim 2 wherein syndiotactic polypropylene is present in an amount in the range between about 1% and 20% and the slip agent is present in an amount between about 0.05% and about 1%.

8. Film of claim 7 wherein syndiotactic polypropylene is present in an amount in the range of between about 5% and 20% and the slip agent is present in an amount between about 0.05% and about 0.2%.

9. Film of claim 3 wherein syndiotactic polypropylene is present in an amount in the range between about 1% and 20% and the slip agent is present in an amount between about 0.05% and about 1%.

10. Film of claim 9 wherein syndiotactic polypropylene is present in an amount in the range of between about 5% and 20% and the slip agent is present in an amount between about 0.05% and about 0.2%.

11. Film of claim 4 wherein syndiotactic polypropylene is present in an amount in the range between about 1% and 20% and the slip agent the slip agent is erucamide present in an amount between about 0.05% and about 1%.

12. Film of claim 11 wherein syndiotactic polypropylene is present in an amount in the range of between about 5% and 20% and the slip agent is present in an amount between about 0.05% and about 0.2%.

13. Process of producing a polypropylene film layer having reduced coefficient of friction comprising the steps of:
   A) Blending, compounding, mixing or combinations thereof, at least 80% isotactic polypropylene with:
      i) between about 0.1% to about 20% syndiotactic polypropylene; and
      ii) about 0.01% to about 1.5% of a slip agent comprising a fatty amide to form a resin, and
   B) Forming a film layer of the resulting resin;
      wherein the polypropylene film layer has a coefficient of friction that is less than a polypropylene film layer made from a resin without syndiotactic polypropylene that is otherwise identical.

14. Process of claim 13 wherein syndiotactic polypropylene is added in an amount in the range between about 1% and 20% and the slip agent is added in an amount between about 0.05% and about 1%.

15. Process of claim 14 wherein syndiotactic polypropylene is added in an amount in the range of between about 5% and 20% and the slip agent comprises erucamide that is added in an amount between about 0.05% and about 0.2%.

16. The process of claim 13 wherein the film layer has a coefficient of friction less than about 0.50 as measured at 23° C. one day after film formation.

17. The process of claim 13 wherein the film layer has a coefficient of friction less than about 0.40 as measured at 23° C. one day after film formation.

18. The process of claim 13 wherein the film layer has a coefficient of friction less than about 0.35 as measured at 23° C. three days after film formation.

* * * * *

UNITED STATES PATENT AND TRADEMARK OFFICE
CERTIFICATE OF CORRECTION

PATENT NO.    : 6,630,245 B2
DATED         : October 7, 2003
INVENTOR(S)   : Liko Sum et al.

It is certified that error appears in the above-identified patent and that said Letters Patent is hereby corrected as shown below:

Column 6,
Lines 23-26, should read:

11. Film of claim 4 wherein syndiotactic polypropylene is present in an amount in the range between about 1% and 20% and the slip agent is ercuamide present in an amount between about 0.05% and about 1%.

Signed and Sealed this

Sixteenth Day of March, 2004

JON W. DUDAS
*Acting Director of the United States Patent and Trademark Office*